United States Patent [19]

Schall

[11] 4,131,185
[45] Dec. 26, 1978

[54] FRICTION CLUTCH SYNCHRONIZER WITH RESILIENT GEAR COUPLING

[75] Inventor: Myron M. Schall, Toledo, Ohio

[73] Assignee: Dana Corporation, Toledo, Ohio

[21] Appl. No.: 803,023

[22] Filed: Jun. 3, 1977

[51] Int. Cl.² ............... F16D 23/04; F16D 25/061; F16D 25/063

[52] U.S. Cl. ............... 192/53 B; 192/85 A; 192/87.17; 192/89 B

[58] Field of Search ............ 192/48.91, 53 B, 85 A, 192/87.17, 89 B

[56] References Cited

U.S. PATENT DOCUMENTS

| | | | |
|---|---|---|---|
| 1,368,888 | 2/1921 | Brown | 192/53 B |
| 1,898,190 | 2/1933 | Kohler | 192/67 R |
| 2,275,204 | 3/1942 | Smirl | 192/85 |
| 2,384,584 | 9/1945 | Wildhaber | 192/108 |
| 2,682,327 | 6/1954 | Retz | 192/4 |
| 3,063,529 | 11/1962 | Cook | 192/53 B |
| 3,266,608 | 8/1966 | Lemieux | 192/89 B |
| 3,315,773 | 4/1967 | Aschauer | 192/48 |
| 3,324,981 | 6/1967 | Aschauer | 192/48 |
| 3,910,131 | 10/1975 | Richards | 192/67 R |

*Primary Examiner*—Allan D. Herrmann
*Attorney, Agent, or Firm*—Richard D. Emch; Robert M. Leonardi

[57] ABSTRACT

A clutch assembly having a disc pack engageable to approximately synchronize the rotational speed of input and output elements is disclosed. The disc pack has interleaved discs operatively connected to the elements of the clutch assembly. Also operatively connected to the elements of the clutch assembly are a pair of clutch collar gears, one of which is spring-biased. The disc pack is compressed to begin rotational speed synchronization of the input and output elements of the clutch assembly. The gears are urged into engagement before complete synchronization has been achieved. The gears slip against one another until the input and output elements are nearly equal in speed. At this time the gears will positively engage and lock the input and output elements together.

7 Claims, 3 Drawing Figures

FRICTION CLUTCH SYNCHRONIZER WITH RESILIENT GEAR COUPLING

BACKGROUND OF THE INVENTION

The present invention relates to a novel and useful clutch mechanism adapted to selectively engage two rotating, power transmitting members. More specifically, the resilient gear coupling clutch assembly of the instant invention is intended to selectively synchronize and positively engage the rotating input and output shafts as might be incorporated into a motor vehicle transmission.

As more powerful engines and more rugged transmissions are built to match the increasing weight and payload of motor vehicles, complementary improvements in clutch structure and function have been sought. Furthermore, the increasing concern about efficiency and fuel conservation has added a new parameter to the design-efficiency equation.

Conventional motor vehicle friction clutch assemblies commonly utilize what is known in the art as a disc pack clutch assembly. The disc pack comprises a plurality of interleaved discs. One alternate set of discs is attached to an input or drive member and the second alternate set of discs is attached to an output or driven member. Compression of this disc pack by hydraulic or electric means increases the friction between the discs, synchronizes the speed of the input and output members and transmits power therebetween.

As it becomes necessary to transmit increasingly large amounts of power through the disc pack, two problems arise. The first is a limitation on size. Either larger plates, more plates, or more and larger plates are required to transfer more power. The clutch assembly may therefore become so bulky that it will not fit conveniently into the space allocated for it in the motor vehicle. The second problem is a product of the increased size. By increasing disc pack surface area, the disengaged friction between the input and output members is also increased. This means more power must be delivered by the engine at operating speeds in a multiple speed transmission, and the result is increased fuel consumption. The alternative to a large clutch is often a smaller clutch or a clutch with fewer disc packs operated at or near the limit of its power handling capacity. This creates problems of a more conventional nature. It will slip under high load conditions with premature failure due to overheating of the clutch assembly.

SUMMARY OF THE INVENTION

The instant invention comprises a clutch having a relatively small disc pack clutch, i.e., a disc pack assembly having a torque carrying capacity small in comparison to that of the motor and other elements in the drive train, and a sequentially engageable spring-biased resilient gear coupling. The terms synchronizing type disc pack are used to distinguish this disc pack assembly from a conventional disc pack having a substantially larger number of plates. A synchronizing disc pack is capable of carrying only sufficient torque to attempt to synchronize the input and output members whereas a conventional or full disc pack clutch is capable of transferring all torque delivered to it by the engine to other downstream elements in the power train.

The synchronizing disc pack selectively engages the input or drive clutch member with the output or driven member. This selective engagement is controlled by a hydraulic piston which operates through a spring and compresses the disc pack.

The clutch further includes a selectively engageable gear set which provides a power flow path in addition to that offered by the synchronizing disc pack. One gear of the set is operatively connected to the input member; the second to the output member. One gear of the gear set resembles a collar and is slidably mounted by splines which allow limited travel in a directionn normal to the plane of the engaging gears. This slideable gear is also spring-biased toward the mating gear.

As the synchronizing disc pack is compressed, the speeds of the input and output member are urged into coincidence; as pressure is increased the resilient gear tooth coupling attempts to engage, but because of the disparity of rotational speeds, the controlled spring bias against the gear collar and the resultant forces on the faces of mating gear teeth, the gear teeth remain disengaged and slip against one another. Continued engagement of the synchronizing disc pack and the increased friction produced by the slipping gears further urges the speeds of the input and output member into coincidence. As synchronism of the input and output members is approached, the axial spring force will overcome the longitudinal and resultant forces caused by the slippage of the gear teeth upon one another and the spring-biased collar gear teeth will drop in and positively lock with its mating teeth.

DESCRIPTION OF THE PREFERRED EMBODIMENT

Figure 1:
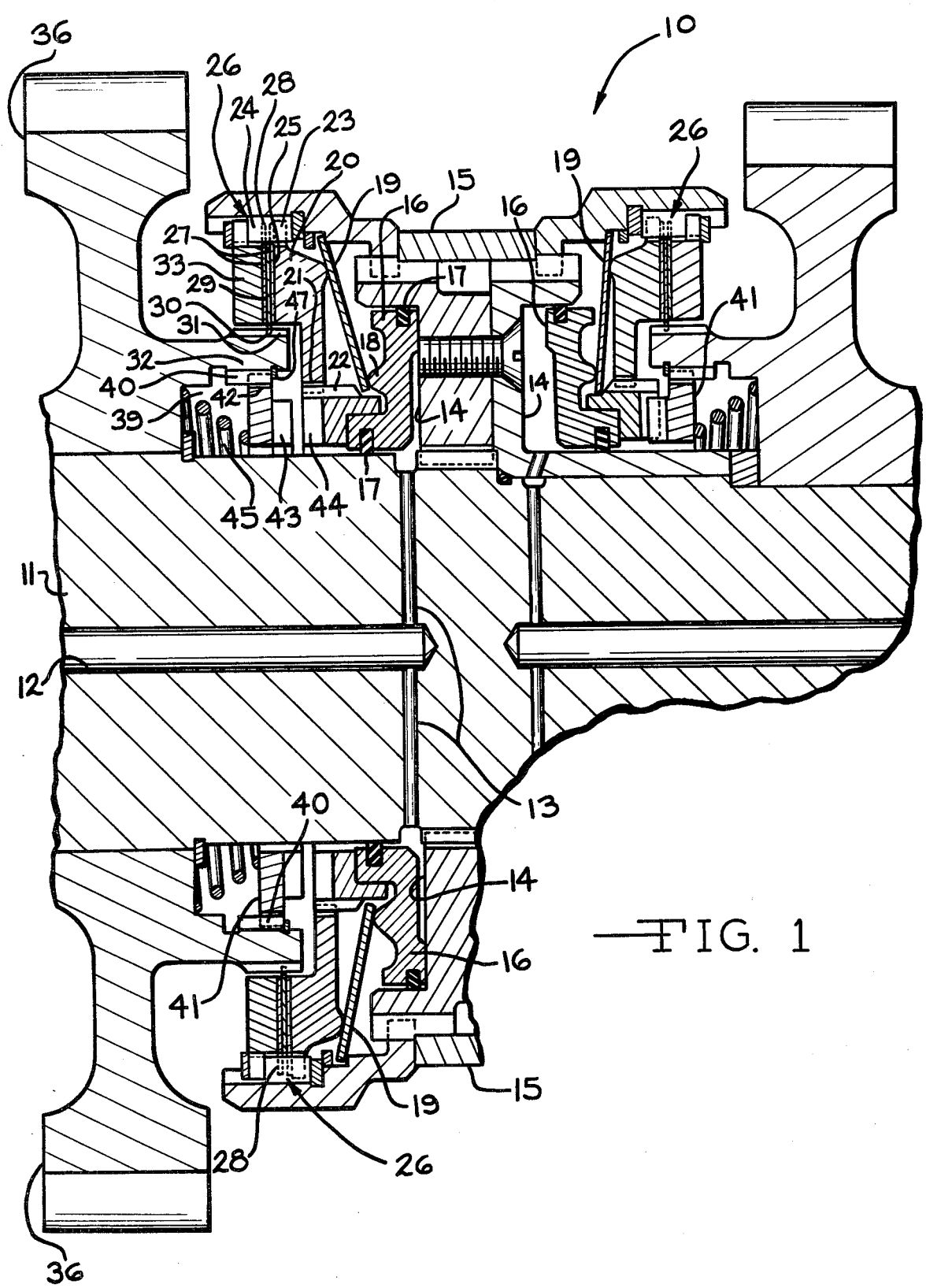
FIG. 1 is an axial cross sectional view of a clutch assembly incorporating the present invention, illustrating the clutch in the disengaged position on the left and illustrating a fully engaged clutch assembly on the right.

Referring now to the drawings and particularly FIG. 1, a clutch assembly embodying the present invention is shown generally by the reference number 10. Specifically, the clutch assembly 10 is adapted to permit the transmission of power from a gear 36 which is concentrically and rotatably mounted to an output shaft 11.

The output shaft 11 may be a component of a conventional transmission such as is used in a truck or other motor vehicle and powers means external to the illustration which are not shown. Within the shaft 11 is a longitudinal passageway 12 which is filled and pressurized with hydraulic fluid. The longitudinal passageway 12 communicates with a plurality of radially oriented passageways 13 which intersect the longitudinal passageway 12 and transport the pressurized hydraulic fluid radially outwardly to a hydraulic chamber 14. The hydraulic chamber 14 defines an annular chamber surrounding and coaxially oriented with the shaft 11. The hydraulic chamber 14 is defined on one side by an outer clutch housing 15 which is affixed to and rotates with the shaft 11 and on the opposing side by a hydraulic clutch piston assembly 16. The hydraulic clutch piston assembly 16 is of annular configuration and surrounds and is positioned coaxially with shaft 11. The hydraulic clutch piston assembly 16 also contains two annular concentric seals 17 which retain the pressurized hydraulic fluid within the hydraulic chamber 14. The hydraulic clutch piston assembly 16 is capable of longitudinal motion, i.e., motion coaxial to the axis of shaft 11 in response to variations of hydraulic pressure in the chamber 14.

The longitudinal motion of the hydraulic piston assembly 16 is transmitted by a bearing point 18 to Belleville spring 19 which transmits force to a moveable clutch support 20. The Belleville spring 19 is a single piece initially coned annulus encircling shaft 11 and coaxial thereto. The Belleville spring 19 biases the hydraulic clutch piston assembly 16 to the right as illustrated in FIG. 1, and therefore returns the hydraulic clutch piston assembly 16 to the right when hydraulic pressure is removed or lessened in the chamber 14. The moveable clutch support 20 is likewise of annular configuration and is mounted concentrically about and coaxially with shaft 11.

On the inner edge of the moveable clutch support 20 are teeth 21 oriented longitudinally, i.e., parallel to the axis of shaft 11, which mate with complementary teeth 22, on the hydraulic clutch piston assembly 16. These mating teeth function as a spline; positively rotationally engaging the moveable clutch support 20 with the hydraulic clutch piston assembly 16 while permitting longitudinal displacement, i.e., movement parallel to the axis of the shaft 11, in response to the force exerted upon it by annular spring 19.

Around the outer edge of the moveable clutch support 20 are a plurality of outwardly directed teeth 23, oriented longitudinally, i.e., parallel to the axis of the shaft 11 which mate with complementary channels 24 in the outer clutch housing 15. These mating teeth 23 and the channels 24 function as a spline; positively rotationally engaging the moveable clutch support 20 with the outer clutch housing 15 while permitting longitudinal displacement, i.e., movement parallel to the axis of the shaft 11, in response to the force exerted upon it by the annular spring 19. Thus, the hydraulic clutch piston assembly 16 and the moveable clutch support 20 are both constrained to rotate with the outer clutch housing 15 and the shaft 11 because of the mating teeth 21 and 22 and the teeth 23 and the channels 24, while being simultaneously permitted to translate longitudinally parallel to the axis of the shaft 11. The moveable clutch support 20 also includes a flat face 25 which is in contact with the outer surface of an outer disc of a synchronizing disc pack 26. The synchronizing disc pack 26 consists of a small number of interleaved alternate sets of clutch plates. By comparison with conventional clutch disc packs having many more frictional plate disc packs and which are capable of carrying the total power transmitted through the clutch, this disc pack has fewer number of plates and is capable of synchronizing the rotational speeds of the input and output members of the clutch but not necessarily capable of carrying the total torque transmitted through the clutch.

One alternate set of clutch plates 27 contains outwardly extending splines 28 which engage matching channels 24 in the outer clutch housing 15. The other alternate set of clutch plates 29 includes a plurality of inwardly extending splines 30 which engage matching longitudinally oriented channels 31 contained in an annular clutch support member 32. The synchronizing disc pack 26 is contained on its opposite side by an annular retaining block 33 which is affixed to the outer clutch housing 15 and is coaxially positioned about the shaft 11. The plurality of channels 24 in the outer clutch housing 15 and the channels 31 in the inner clutch support member 32 extend longitudinally, i.e., parallel to the axis of shaft 11. The channels 24 and 31 mate with the splines 28 and 30, respectively. The clutch plates 27 rotate with the outer housing 15 and the clutch plates 29 rotate with the clutch support member 32 while permitting longitudinal displacement of the disc clutch elements.

On the opposite, inwardly directed surface of the annular clutch support member 32 is a set of longitudinally oriented teeth 40 having a central axis coincident with that of the shaft 11. Positioned in the annular cavity 39 between the teeth 40 and the shaft 11 is an annulus 41 having teeth 42 complementary to and mating with the teeth 40 on the annular clutch support member 32. The mating teeth 40 and 42 rotationally engage the annular clutch support member 32 and the annulus 41 while permitting longitudinal displacement of the annulus 41 along the axis of the shaft 11. Upon the radial face of the annulus 41, adjacent the hydraulic piston 16, are gear teeth 43 arranged radially and concentrically around the shaft 11. Directly opposite the gear teeth 43 are a second, mating set of gear teeth 44 on the hydraulic clutch piston assembly 16. The mating gear teeth 43 and 44 are preferably curvic gears as described in U.S. Pat. No. 2,384,582 or U.S. Pat. No. 2,384,584. In the relaxed position of the hydraulic clutch piston assembly 16, the gear teeth 43 and 44 are disengaged (see FIG. 1); while in its fully extended position the gear teeth 43 and 44 are fully engaged (see FIG. 3).

Against the opposite radial face of the annulus 41 is a helical spring 45 which is concentrically mounted about the shaft 11 in a chamber 39. The helical spring 45 biases the annulus 41 and its gear teeth 43 toward the gear teeth 44 mounted on the hydraulic clutch piston assembly 16. The longitudinal travel of the annulus 41 is limited by an annular stop 47 attached to the annular clutch support member 32. Because the annulus 41 is linked to the input gear 36 through the teeth 42 and the teeth 40 affixed to the clutch support member 32, the annulus 41 rotates with the input gear 36 but is capable of travel away from the gear teeth 44 and along the axis of the shaft 11, in response to pressure against the annulus 41 sufficient to compress the helical spring 45.

Figure 2:
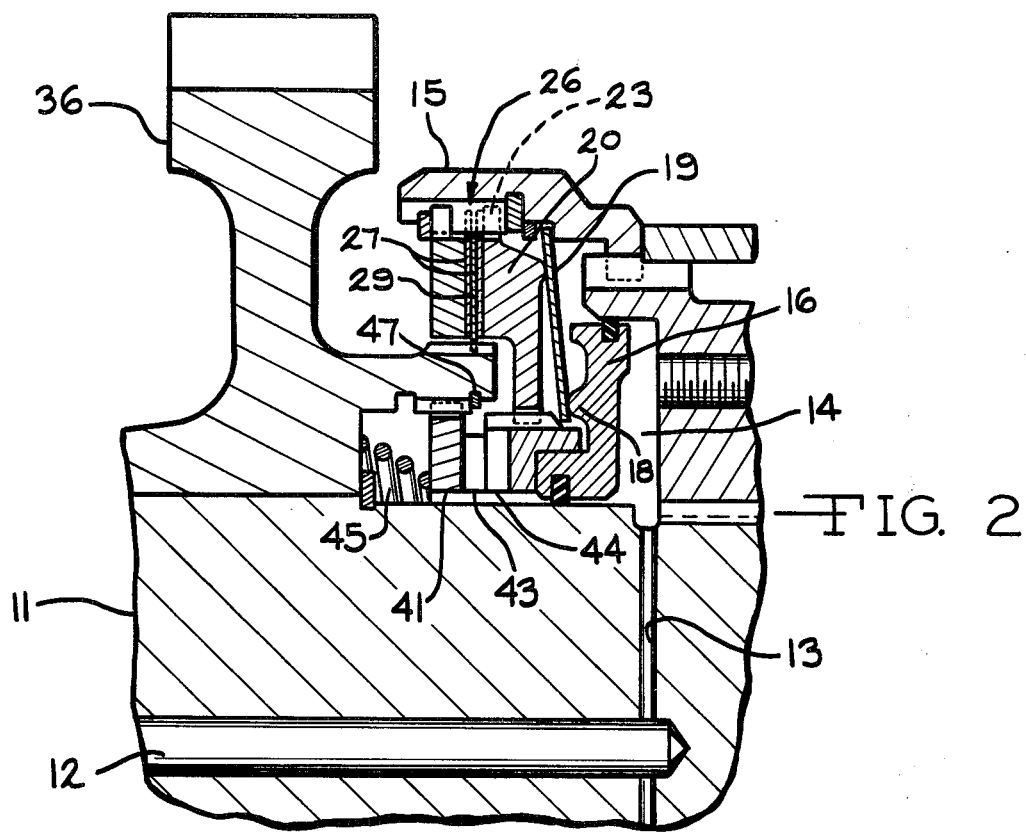
FIG. 2 is an axial cross sectional view of a clutch assembly incorporating the present invention wherein the clutch is shown in a semi-engaged condition.
Figure 3:
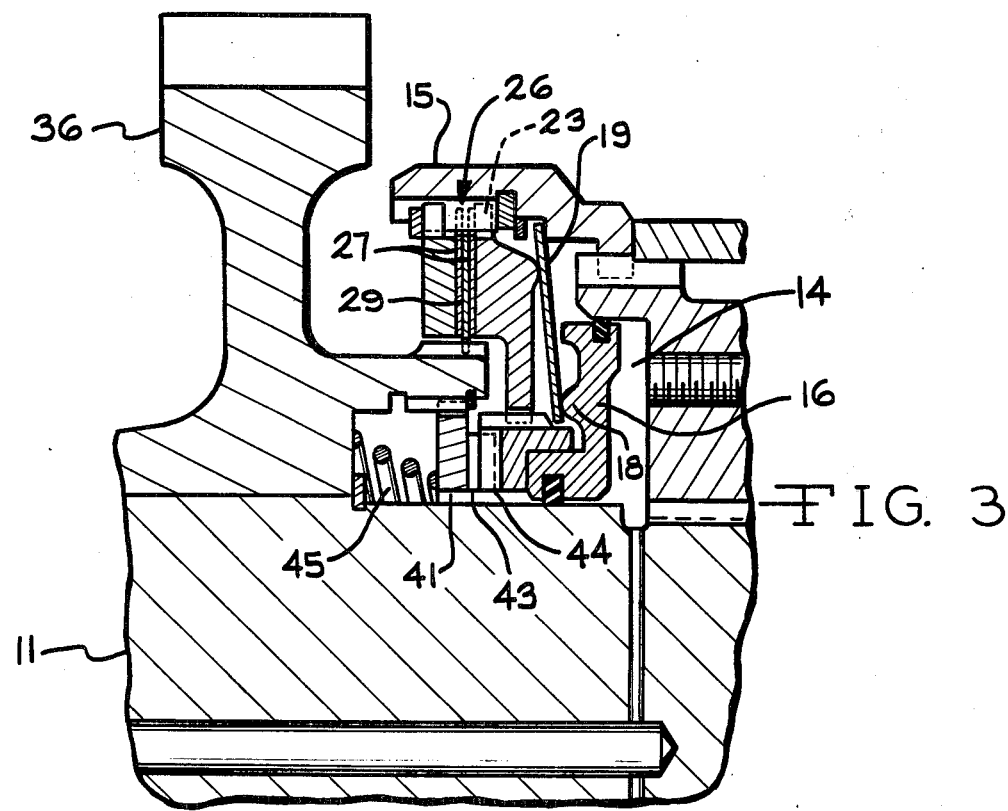
FIG. 3 is also an axial cross sectional view of a clutch assembly incorporating the present invention which is shown in the fully engaged position.

The sequence of operation of the resilient clutch assembly 10 is illustrated in FIGS. 1, 2 and 3. FIG. 1 shows the clutch 10 in the relaxed condition. The output shaft 11, is rotating and therefore rotating with it, is the clutch housing 15, the hydraulic clutch piston assembly 16, the Belleville spring 19, the radial teeth 44, and clutch discs or plates 27.

Referring now to FIG. 2, the hydraulic pressure in the longitudinal passageway 12 is increased by external means such as a hydraulic clutch. Fluid flows along the passageway 12 through the radial passageways 13 and into the hydraulic chamber 14. This causes the hydraulic clutch piston assembly 16 to move to the left toward the annular spring 19 and the moveable clutch support 20. As pressure increases in the hydraulic chamber 14, the hydraulic piston assembly 16 advances further to the left and increases pressure upon the moveable clutch support 20 and upon the elements of the synchronizing disc pack 26. This increasing pressure exerted upon the synchronizing disc pack 26 engages the alternate clutch disc sets 27 and 29 and begins to bring the rotational speed of the input gear 36 into coincidence with the rotational speed of the output shaft 11.

The hydraulic piston assembly 16 is moved to the extreme left, to its limit of travel, and maximum pressure is now being applied to the synchronizing disc pack 26. However, since the speeds of the output shaft 11 and the input gear 36 have not been brought into coincidence, the mating teeth 43 and 44 have not engaged. Rather, the helical spring 45 has been compressed from its position illustrated in FIG. 1, the annulus 41 moved away from the stop 47, and the gear teeth 43 and 44 are slipping against one another. In a conventional clutch collar/transmission unit, this slippage would be accompanied by a loud, annoying chatter. Repeated or continued operation of a conventional clutch assembly in this condition would accelerate wear of clutch components and cause premature failure. However, because the annulus 41 is spring loaded and has a relatively low mass, the teeth 43 bounce across the matching teeth 44 with minimal chatter.

FIG. 3 illustrates the clutch mechanism in a fully engaged condition. The speeds of the output shaft 11 and the input gear 36 are now identical. This coincidence of speed has been caused initially by the increasing friction in the synchronizing disc pack 26 resulting from increased pressure in the hydraulic chamber 14 which is transmitted to the clutch assembly through the Belleville spring 19, and secondly, by the slipping engagement of the teeth 44 and the teeth 43 mounted on the annulus 41 which is spring biased by the helical spring 45.

In this completely engaged condition, the hydraulic system maintains a steady pressure. The synchronizing disc pack 26 is now neither exhibiting any slip between the alternate sets of clutch plates, nor transmitting any appreciable power through its power path. Rather, the mating teeth 43 and 44 are in positive meshed engagement and are transmitting substantially all power from the gear 36 to to the output shaft 11 through this major power path. The helical spring 45 is relaxed from the condition illustrated in FIG. 2 wherein the teeth 43 affixed to the annulus 41 were slipping across the teeth 44. The engagement attained by the teeth 43 and 44 is completely positive and under normal operating conditions, will carry power equivalent to a conventional clutch collar assembly without slippage or disengagement.

Disengagement of the clutch assembly is accomplished by reversing the sequence of events just described. Hydraulic pressure in the passageways 12 and 13 and the chamber 14 is lessened, causing the hydraulic piston assembly 16 to move to the right, disengaging the matching radially oriented sets of teeth 43 and 44 and relaxing the pressure applied to the synchronizing disc pack 26. The clutch assembly 10 is now in the condition illustrated in FIG. 1 and the input gear 36 may now freewheel upon the output shaft 11, again, with the exception of the negligible friction between these two members generated by the disengaged, synchronizing disc pack 26.

Various other embodiments and alterations to this preferred embodiment will be apparent to those skilled in the art and may be made without departing from the spirit and scope of the following claims.

What I claim is:

1. A clutch assembly for engaging a first member and a second member comprising, a synchronization disc assembly operatively connected between said first member and said second member, a piston assembly positioned for applying force to said synchronization disc assembly for loading said disc assembly and urging said first and second members to approach synchronous rotation, said piston assembly mounting first set of gear teeth, said first set of gear teeth being mounted for rotation with said first member, a low mass body mounting a second set of gear teeth mateable with said first set of gear teeth, said low mass body being operatively connected for rotation with said second member, and means for urging said low mass body toward said first set of gear teeth, whereby upon actuation said piston assembly compresses said disc assembly to urge said first member and said second member to approach synchronous rotation, actuation of said piston assembly causes said first set of gear teeth to contact said second set of gear teeth, said low mass body allows said second set of gear teeth to come into contact with said first set of gear teeth with a force that allows the gear teeth to slip against one another until synchronization of said first member and said second member is approached and the gear teeth mate in a positive full load relationship.

2. The clutch assembly of claim 1, including spring means positioned between said fluid piston assembly and said synchronization disc assembly for applying force to said disc assembly.

3. A clutch assembly for engaging a rotatable shaft and a drivable member mounted on said shaft comprising, a synchronization disc assembly having a first series of discs operatively connected to said member, a second inter-leaved series of discs operatively connected to said shaft, a piston assembly positioned for applying force to said synchronization disc assembly, said piston assembly including a piston surrounding said shaft and a spring operatively engaging said piston and said synchronization disc assembly for loading said disc assembly, said piston assembly mounting a first set of gear teeth, said first set of gear teeth being mounted for movement along said shaft and for rotation with said shaft, a low mass annulus rotatably journaled on said shaft, said annulus mounting a second set of gear teeth mateable with said first set of gear teeth, said annulus being operatively connected for rotation with said drivable member and means for urging said low mass annulus and said second set of gear teeth toward said first set of gear teeth, whereby upon actuation said piston assembly compresses said spring loading said disc assembly to urge said shaft and said drivable member to approach synchronous rotation, actuation of said piston assembly causes said first set of gear teeth to contact said second set of gear teeth to come into contact with said first set of gear teeth with a force that allows the gear teeth to slip against one another until synchronization of said shaft and said drivable member is approached and the gear teeth mate in a positive full load relationship.

4. The clutch assembly of claim 3, wherein said spring comprises a Belleville spring.

5. The clutch assembly of claim 3, wherein said urging means includes a helical compression spring adjacent said low mass annulus.

6. The clutch assembly of claim 3, wherein said first set of gear teeth includes radial teeth having longitudinally convex radial sides and said second set of gear teeth includes radial teeth having longitudinally concave opposite sides.

7. The clutch assembly of claim 3, wherein said first set of gear teeth includes generally radial teeth whose opposite sides are longitudinally convex, and said second set of gear teeth includes generally radial teeth whose opposite sides are longitudinally concave, the radii of lengthwise curvature of said convex and concave tooth sides being equal.

* * * * *